United States Patent [19]

Aguirre

[11] 3,755,798

[45] Aug. 28, 1973

[54] DATA RECOVERY SYSTEM HAVING TRACKING SAMPLING WINDOW

[75] Inventor: Michael C. Aguirre, Oklahoma City, Okla.

[73] Assignee: Honeywell Information Systems Inc., Waltham, Mass.

[22] Filed: Feb. 29, 1972

[21] Appl. No.: 230,376

[52] U.S. Cl. .......................................... 340/174.1 H
[51] Int. Cl. .............................................. G11b 5/02
[58] Field of Search ................................ 328/63, 74; 340/174.1 A, 174.1 H

[56] References Cited

UNITED STATES PATENTS

| | | | |
|---|---|---|---|
| 3,609,560 | 9/1971 | Greenburg | 328/63 |
| 3,217,329 | 11/1965 | Gabor | 340/174.1 A |
| 3,395,355 | 7/1968 | Gabor | 340/174.1 A |
| 3,382,492 | 5/1968 | Santana | 340/174.1 A |

*Primary Examiner*—Vincent P. Canney
*Attorney*—Fred Jacob, Gerald R. Woods et al.

[57] ABSTRACT

A data recovery system having a variable frequency ramp generator for producing ramp voltages having constant minimum and maximum values and a variable frequency phase locked to the frequency at which information is read from a magnetic media. The ramp voltages are applied to low and high threshold voltage detectors. These detectors and associated logic elements establish sampling windows which track the centers of information storage cells in spite of variations in cell length.

4 Claims, 5 Drawing Figures

PATENTED AUG 28 1973 3,755,798

DATA RECOVERY SYSTEM HAVING TRACKING SAMPLING WINDOW

BACKGROUND OF THE INVENTION

The present invention relates to the art of data storage and more particularly to a data recovery system capable of generating a timing window which tracks the center of data storage cells.

Information can be stored in a standard data processing system by polarizing selected discrete spots on the surface of magnetic storage media such as disks, tapes and drums. The presence of a polarized spot (or the absence of such a spot in a certain surface area) may be referred to as a bit. The stored information can be recovered at will by driving the media past an electromagnetic transducer. The transducer responds to polarized spots on the media surface by generating voltage pulses. To reduce errors during the reading of information, it is a conventional practice to look at or sample information only during the times bits should have been recorded. Sampling in this manner rejects spurious information recorded or read in the interval between normal record or read times. The intervals during which information is sampled are referred to as timing windows or simply windows.

In known prior art data processing systems, windows are generated using a combination of one shot multivibrators for generating a fixed time delay and a fixed width pulse. One of these multivibrators is triggered at the leading edge of a data cell. After a fixed time delay, at least one othe multivibrator is triggered to establish a window having a fixed width. This time-regulated technique of generating windows is satisfactory so long as the cells in which bits are recorded are of reasonably uniform width. Ideally, uniform cells are formed by writing bits at a constant frequency onto a magnetic media moving at a constant speed. As a practical matter, the write frequency may change slightly. Also, the rotational speed of a disk or a drum may vary just as the linear speed of a magnetic tape may vary. As a result, information cells can be narrower or wider than their nominal width. If a cell is wider than normal, a fixed window initiated after a fixed time delay crowds the leading edge of the cell. If the cell is narrower than normal, a window initiated after a fixed time delay crowds the trailing edge of a cell. In extreme cases such a window may not include the cell center at which the bit is recorded. Under such conditions, the chances of an error during data recovery are high.

SUMMARY OF THE INVENTION

The present invention is a data sampling control circuit which produces a sampling window that follows the center of each data cell. The invention includes a timing means in circuit with an electromagnetic transducer. The timing means produces a ramp voltage having fixed minimum and maximum voltages and a slope which varies as a function of the frequency at which data is read from data cells on an information storage medium. A signal generator is connected to the output of the timing means. This signal generator responds at a first ramp voltage level to permit data sampling to begin. The signal generator further responds at a second ramp voltage level to inhibit or end data sampling. The time interval between the occurrences of the first and second voltage levels is the window.

DESCRIPTION OF THE DRAWINGS

While the specification concludes with claims particularly pointing out and distinctly claiming that which is regarded as the present invention, details of one embodiment of the invention, along with its further objects and advantages, may be more readily ascertained from the following detailed description when read in conjunction with the accompanying drawings wherein:

DETAILED DESCRIPTION

Figure 1:
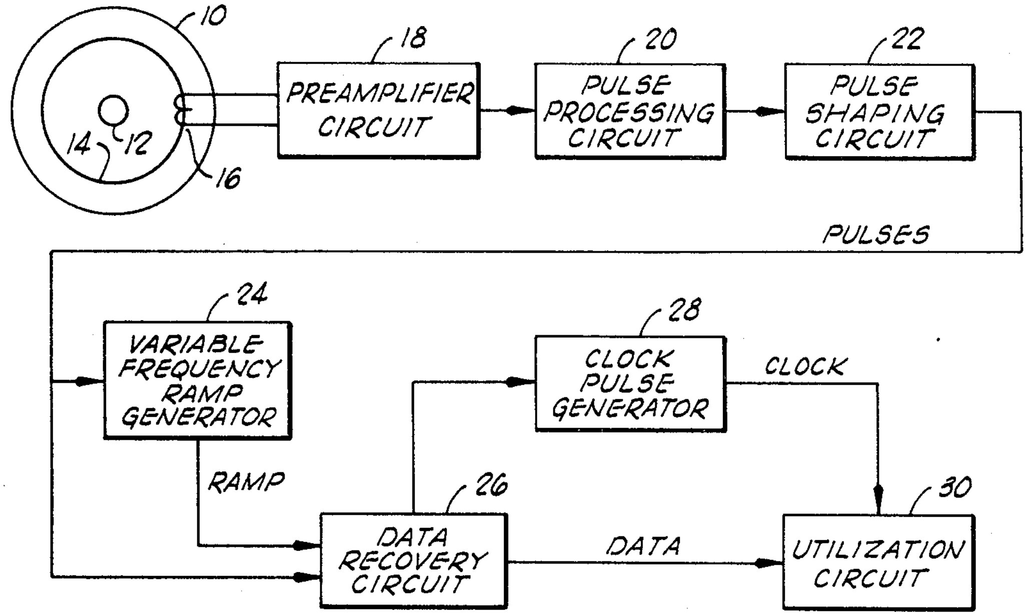
FIG. 1 is a block diagram of a magnetic disk subsystem which includes a data sampling control circuit according to the present invention.

Referring to FIG. 1, the present invention is shown for use in recovering data from a magnetic disk 10. This application of a data sampling control circuit constructed in accordance with the present invention is for purposes of illustration. A data sampling control circuit constructed in accordance with the present invention may be used in any information storage system wherein data is stored in the form of magnetic or non-magnetic representations centered in serially occurring data cells.

In FIG. 1, the magnetic disk 10 rotates on a spindle 12 driven by a suitable motor, not shown. Information is stored on the surface of the magnetic disk 10 in concentric rings or tracks, only one track of which, designated track 14, is shown. Information is stored on these tracks by polarizing or by leaving unpolarized discrete areas or spots. Each area is located at the center of an information cell. A transducer 16 adjacent the track 14 generates electrical signals upon relative motion between the magnetic disk 10 and the transducer. The generated signals contain the data and timing information needed to recover the stored data but may also contain spurious signals caused by electrical noise voltages.

The signals generated by transducer 16 are applied to a preamplifier circuit 18 which amplifies the signals to a required power level. The amplifier signals are processed and shaped by a pulse processing circuit 20 and a pulse shaping circuit 22 connected in series with each other. Circuits 20 and 22 are standard circuits which perform standard shaping operations. In these circuits the amplified signals appearing at the output of the preamplifier circuit 18 are differentiated, amplified, clipped and again differentiated to form positive and negative voltage pulses approximately 180 degrees out of phase with the peaks of signals provided by the transducer 16. The voltage pulses are rectified to form a train of single polarity pulses at the output of the pulse shaping circuit 22.

The train of shaped pulses is applied to a variable frequency ramp generator 24 and to a data recovery circuit 26. Variable frequency ramp generator 24 produces a train of ramp voltage pulses at a frequency locked to the frequency of the train of shaped pulses provided by the pulse shaping circuit 22. The minimum and maximum ramp voltages are fixed while the slope of the ramp is a function of pulse frequency.

The output of the variable frequency ramp generator 24 provides a second input to the data recovery circuit 26. The ramp signal is used by data recovery circuit 26 to generate a series of sampling windows which track the center of data cells. Windows which track cell centers increase the chances that only valid data pulses will be recovered since spurious pulses occurring outside of the normal recording intervals within a cell will be rejected. Details of the preferred embodiments of the variable frequency ramp generator 24 and the data recovery circuit 26 are contained in the following material.

FIG. 1 also shows a clock pulse generator 28 connected to the data recovery circuit 26. Clock pulse generator 28 accepts ramp voltage pulses from a high impedance buffer at the input to data recovery circuit 26. Generator 28, which may be conventional in nature, shapes the ramp voltage pulses to form a train of clock pulses for use by a utilization circuit 30. The present invention does not pertain to clock pulse generator 28 and no further description of the generator is provided.

Figure 3:
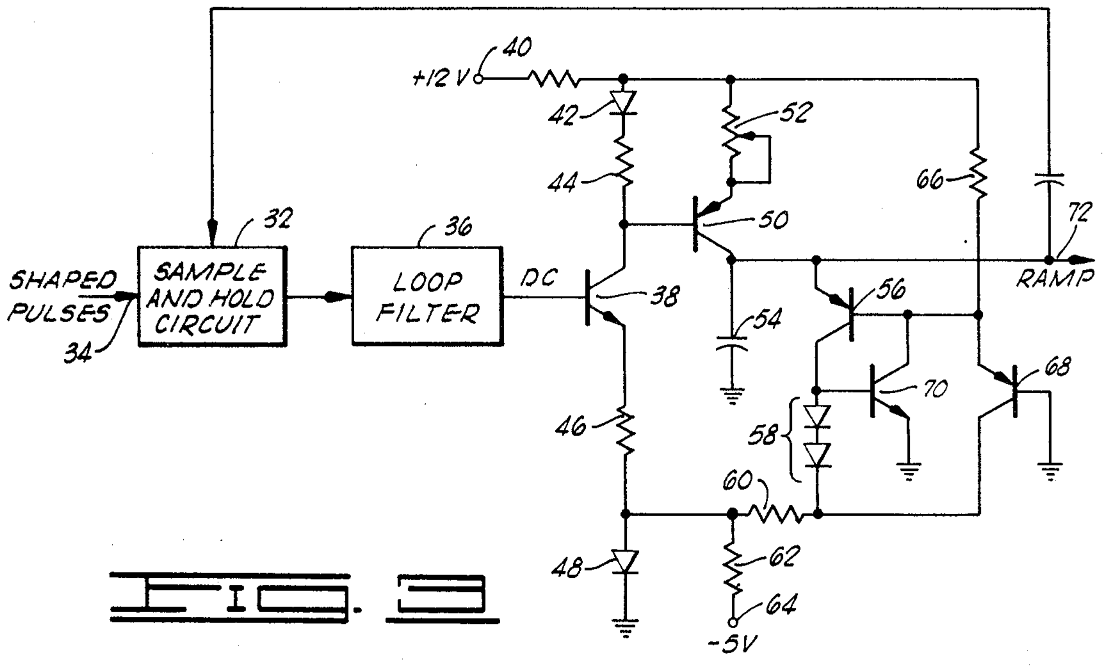
FIG. 3 is a circuit diagram of the variable frequency ramp generator of FIG. 1 wherein certain standard circuits are shown only in block diagram form.

Referring to FIG. 3, the variable frequency ramp generator 24 includes a sample and hold circuit 32. The function of sample and hold circuit 32 is to monitor the ramp voltage currently being generated each time a shaped pulse is applied at an input terminal 34. Any deviation between the values of ramp voltages sampled in succession is indicative of a discrepancy between the frequency of pulses being applied at input terminal 34 and the frequency of the ramp voltage at the output of generator 24. The deviation provides an error voltage which is smoothed by loop filter 36 to provide a DC bias at the base terminal of an NPN transistor 38. Collector terminal bias for the transistor 38 is provided by a positive voltage source 40 through the series combination of a diode 42 and a resistor 44. The emitter of transistor 38 is ultimately connected to ground through a resistor 46 in series with a diode 48.

Transistor 38 provides a high impedance buffer between the output of the loop filter 36 and the base terminal of a PNP transistor 50. PNP transistor 50 is connected to the positive voltage source 40 through a variable resistor 52 in its emitter circuit. The transistor 50 and variable resistor 52 are a current source for a ramp-generating capacitor 54. The magnitude of current provided by this current source to the capacitor 54 is directly proportional to the DC bias on the base of the transistor 38. Since that DC bias is directly related to the frequency at which the shaped pulses 34 are being applied to the sample and hold circuit 32, the magnitude of current being applied to the capacitor 54 is also a direct function of the pulse frequency. At higher than normal pulse frequencies, more current is applied to capacitor 54 to cause the capacitor to charge at a faster than normal rate. That is, the slope of the ramp voltage across the capacitor 54 is higher than normal. At lower than normal pulse frequencies, less current is applied to the capacitor 54 to cause the capacitor 54 to charge at a slower rate. Under the latter conditions, the slope of the voltage ramp is lower than normal.

The maximum voltage to which the capacitor 54 can charge is determined by a voltage limiting circuit including a PNP transistor 56 having its emitter terminal connected directly to the upper plate of capacitor 54 and its collector terminal connected through a pair of diodes 58 and resistors 60 and 62 to a negative voltage source 64. The DC bias at the base terminal of the transistor 56 is fixed by a circuit including a resistor 66 connected to the emitter terminal of a PNP transistor 68. The base terminal of transistor 68 is grounded while the collector terminal is connected through resistors 60 and 62 to the negative voltage source 64. The voltage limiting circuit also includes a NPN transistor 70 having a grounded emitter terminal, a collector terminal connected to the base of transistor 56, and a base terminal connected to the collector terminal of transistor 56.

When capacitor 54 is charging from a minimum value (established in a manner described below) toward its maximum or peak value, the emitter to base junction of transistor 56 is back biased making that transistor non-conductive. So long as transistor 56 remains non-conductive, the voltage at the collector terminal of transistor 50 (the ramp output 72 for the ramp generator 24) increases linearly at a rate determined by the DC bias at the base terminal of transistor 38. When the ramp voltage reaches a peak or maximum value which is equal to the base voltage for transistor 56, transistor 56 is driven into conduction. The increased emitter to collector current flowing through the now conductive transistor 56 increases the base current flowing into transistor 70. When transistor 70 becomes conductive, the base of transistor 56 is driven to ground to latch transistor 56 in its conductive state. Capacitor 54 discharges rapidly through transistors 56 and 70 until the reduced biases at the base and collector terminals of the transistor 70 drive that transistor into its non-conductive state. Thereafter, capacitor 54 continues to discharge through transistor 56, the pair of diodes 58, and resistors 60 and 62 until capacitor 54 reaches the minimum voltage determined by the voltage drop across these components and by the magnitude of voltage produced by negative voltage source 64. The transistor 56 becomes non-conductive at the minimum voltage to open the discharge path for the capacitor 54.

Capacitor 54 charges and discharges repetitively to form a train of ramp voltage pulses having predetermined minimum and maximum values and a slope directly related to the frequency of shaped pulses being applied to the sample and hold circuit 32. In a preferred embodiment of the invention, the ramp voltage on the output 72 has a minimum value of 0.7 volt and a maximum value of 2.7 volt.

Figure 2:
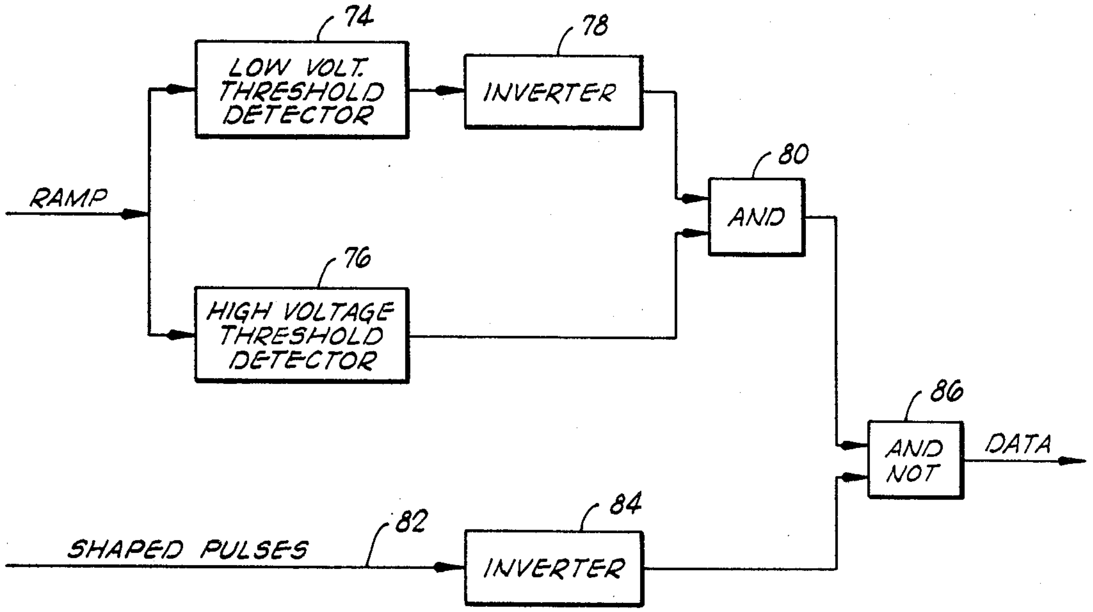
FIG. 2 is a more detailed block diagram of the data recovery circuit shown in FIG. 1.

Referring to FIG. 2, the ramp voltages produced by the variable frequency ramp generator 24 are applied to a window generating circuit including a low voltage threshold detector 74 and a high voltage threshold detector 76 in the data recovery circuit 26. The output of the low voltage threshold detector 74 is a squared waveform which changes from a high level to a lower level when the increasing ramp voltage passes a first predetermined low voltage level or threshold. The output of the threshold detector 74 remains at the lower level until the ramp voltage peaks and begins to fall toward its minimum value. The output of low voltage threshold detector 74 is inverted by a conventional inverter 78.

The output of the high voltage threshold detector 76 is a squared voltage waveform having a high level during the time each ramp voltage pulse is increasing toward the predetermined high voltage on the ramp and a low level during the time each ramp voltage pulse is increasing from the predetermined high voltage toward the peak voltage of the ramp.

The high voltage threshold detector 76 and the inverter 78 provide inputs to an AND gate 80. AND gate 80 logically combines the squared wave signals to produce a sampling window having a width determined by the time required for the ramp voltage to increase from the low threshold voltage to the high threshold voltage. Because the frequency at which ramp voltage pulses are generated by generator 24 is synchronous with the frequency at which pulses are received from the pulse shaping circuit 22, the midpoint of each ramp should be near the center of a data cell. Since each window produced by AND gate 80 is centered on a ramp voltage pulse, it follows that each window is also centered on a data cell.

As shown in FIG. 1, pulses provided by the pulse shaping circuit 22 are applied to the data recovery circuit 26 directly. The direct connection is shown as lead 82 forming the input to a conventional inverter 84. Data sampling is accomplished in the data recovery circuit 26 by combining the outputs of the AND gate 80 and the inverter 84 in an AND-NOT gate 86. The output of AND-NOT gate 86 is an inverted form of the recorded data excluding spurious signals falling outside the sampling window.

Figure 4:
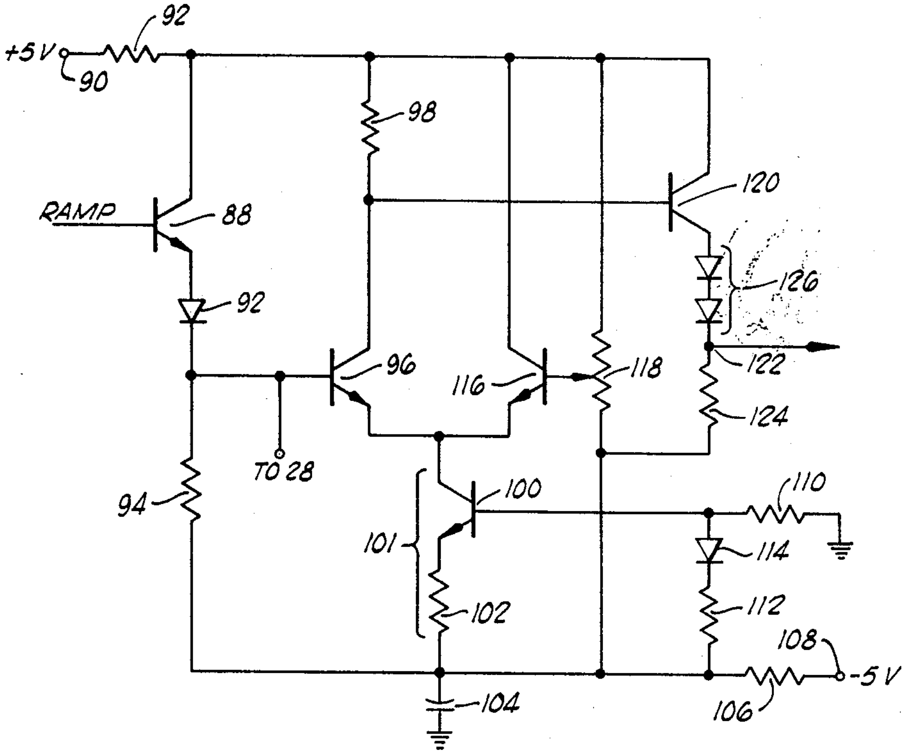
FIG 4 is a circuit diagram of a voltage threshold detector for use in the data recovery circuit.

A circuit diagram of a voltage threshold detector which might be used in the data recovery circuit 26 is illustrated in FIG. 4. The train of ramp voltages produced by variable frequency ramp generator 24 is applied to the base terminal of a NPN transistor 88. The collector terminal of transistor 88 is connected to a positive voltage source 90 through a resistor 92. The emitter circuit of the transistor 88 includes a diode 92 and a resistor 94. Transistor 88 and the associated components function as a high impedance buffer between the capacitor 54 in a ramp generator 24 and the remainder of the voltage threshold detector.

The ramp voltage is effectively reproduced at the base terminal of NPN transistor 96. The clock pulse generator 28 mentioned with reference to FIG. 1 derives its ramp input from a connection to the same base terminal. The collector terminal of the transistor 96 is biased by the positive voltage source 90 through a collector resistor 98 while the emitter terminal of transistor 96 is connected to a current source 101 consisting of a NPN transistor 100 in series with a resistor 102. Resistor 102 is further connected to a capacitor 104 having its opposite lead grounded and to a resistor 106 having its opposite terminal connected to a negative voltage source 108. The current provided by the source 101 is controlled by bias circuit including the negative voltage source 108, the resistor 106, resistors 110 and 112 and a diode 114.

The voltage threshold detector includes a second NPN transistor 116 having its emitter terminal connected in common with the emitter terminal of transistor 96 to the upper end of the current source. A fixed DC bias is established at the base terminal of the transistor 116 by means of a voltage divider arrangement including the positive voltage source 90, the resistor 92, a potentiometer 118, the resistor 106, and the negative voltage source 108. The level of bias at the base terminal of transistor 116 establishes the voltage threshold.

While the ramp voltage is below the threshold value, the low levels of current flowing into the base terminal of transistor 96 keep that transistor in a non-conductive state. The high collector voltage of non-conducting transistor 96 causes a NPN transistor 120 to conduct. Transistor 120 and serially connected diodes 126 form a level shifting circuit. The voltage drops across these components establish a high logic level voltage at a junction 122 which is suitable for use by AND gate 80 and AND-NOT gate 86.

When the ramp voltage reaches and exceeds the threshold voltage, the base to emitter junction of transistor 96 becomes forward biased, driving that transistor into conduction. The resulting drop in collector voltage for transistor 96 is reflected at the base terminal of transistor 120. Transistor 120 is driven to a lower level of conduction, thereby lowering the voltage at junction 122 to a low logic level value.

The voltage threshold detector shown in FIG. 4 produces a squared voltage waveform having a high logic level output from the minimum ramp voltage to the threshold voltage and a low logic level output from the threshold to the peak ramp voltage. The circuit as shown may be used as the high voltage threshold detector by adjusting the bias of transistor 116. The circuit can also be used as the low voltage threshold detector by adjusting the bias on transistor 116 and by connecting the inverter 78 of FIG. 2 to the junction 122. The output of inverter 78 will be a squared voltage waveform having a low logic level while the ramp voltage is less than the low threshold voltage and a high logic level while the ramp voltage is equal to or greater than the low threshold voltage.

Figure 5:
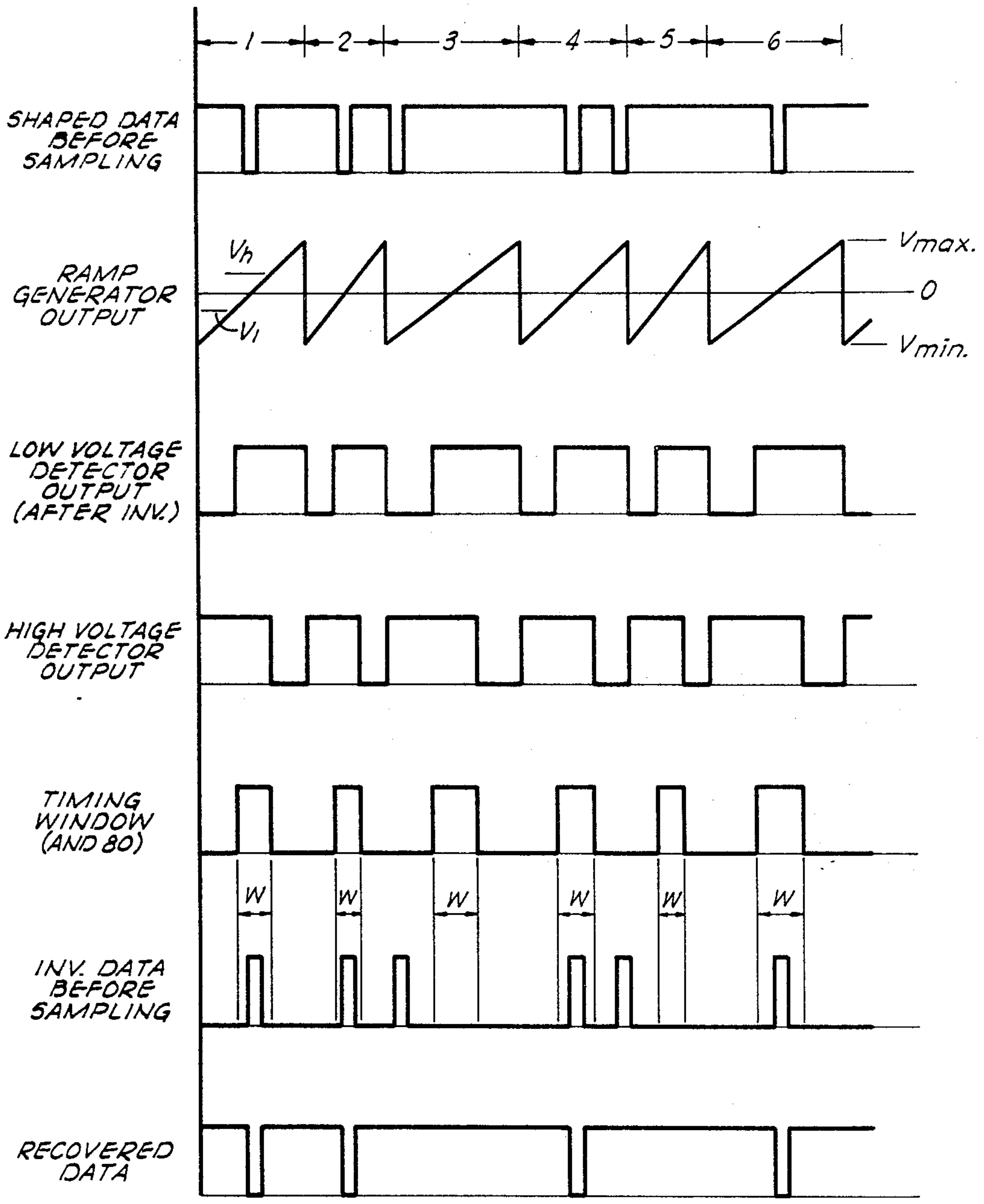
FIG. 5 is a timing diagram of selected signals generated during use of the present invention.

The operation of the data sampling control circuit described above may be further clarified with reference to the signals illustrated in FIG. 5. FIG. 5 illustrates the signals which might be generated in sampling six successive cells of varying widths. If cell 1 is taken to be of normal width, cells 2 and 5 are narrower than normal, cells 3 and 6 are wider than normal, and cell 4 is normal. The variations in cell widths are exaggerated for purposes of illustration. Also, the variations in cell widths would normally not be staggered. Normally, the cell widths (or pulse frequencies) would gradually shift away from and then toward normal values.

The first row of signals represents the output of the pulse shaping circuit 22 where the pulse train represents the binary information 110101 as recorded in the commonly used non-return-to-zero recording code. It will be seen that the pulse train includes pulses representing the binary 1's at the centers of cells 1, 2, 4 and 6, an absence of pulses representing binary 0's at the centers of cells 3 and 5 and spurious pulses near the leading edge of cell 3 and the trailing edge of cell 4. The function of the present invention is to permit sampling of the pulse train only during time intervals centered on the cells and to thereby eliminate the spurious pulses shown in cells 3 and 4.

The second row of signals represents the output of the ramp generator 24. The low and high threshold voltages are designated a $V_l$ and $V_h$.

The third row of signals shows the output of the inverter 78 in circuit with low voltage threshold detector. It can be seen that the output of this inverter changes from a first or low level to a second or high level when the ramp increases from $V_{min}$ to $V_1$. The output of the low voltage threshold detector remains at the second or higher level until the ramp voltage peaks at $V_{max}$ and falls toward its minimum value.

The fourth row of signals in FIG. 5 represents the output of the high voltage threshold detector. The output remains at the high level as the ramp voltage increases from $V_{min}$ to a high threshold voltage $V_h$. As the ramp voltage increases beyond $V_h$, the output of the high voltage threshold detector falls to the low level where it remains until the ramp voltage reaches its peak at $V_{max}$ and begins to fall toward its minimum $V_{min}$.

The fifth row of signals in FIG. 5 represents the window which is obtained by logically combining the outputs of the low and high voltage threshold detectors (rows 3 and 4) in the AND gate 80 of FIG. 2. The waveforms show that the windows are at a high or sample-permitting level only when the outputs of the low and high voltage threshold detectors are both at a high level. If the output of either or both of the detectors is at a low level, the output of the AND gate 80 is at a low or sample-inhibiting level.

The sixth row of signals represents the output of inverter 84. This output is simply the inverted form of the pulse train produced by pulse shaping circuit 22. The AND-NOT gate 86 of FIG. 2 logically combines the signals shown in the fifth and sixth rows and inverts the result to yield the recovered data shown in the last row of FIG. 5. Since the spurious pulses located near the leading edge of cell 3 and the trailing edge of cell 4 fall outside of the sampling windows for those cells, these pulses are eliminated from the recovered data.

While there has been described what is considered to be a preferred embodiment of the invention, variations and modifications will occur to those skilled in the art. Therefore, it is intended that the appended claims shall be construed as including all such variations and modifications as fall within the true spirit and scope of the invention.

I claim

1. For use in recovering data from a memory system including an information storage medium on which data is recorded in serially occurring cells and a transducer for detecting the presence or absence of recorded data in a cell, a data sampling control circuit for producing a window which tracks the center of each data cell including:

a. ramp generator means in circuit with the transducer for producing a ramp voltage having fixed minimum and maximum voltages and a slope which varies as a function of the frequency at which data is read from the cells; and b. window generator means connected to the output of said ramp generator means and comprising;

i. a first voltage threshold detector connected to the output of said ramp generator means for producing a squared voltage waveform having a first level when the ramp voltage is less than the first voltage and a second level when the ramp voltage is greater than the first voltage, ii. a second voltage threshold detector connected to the output of said ramp generator means for producing a squared voltage waveform having a first level when the ramp voltage is greater than the second voltage and a second level while the ramp voltage is less than the second voltage, and iii. logic means for combining the outputs from said first and second voltage threshold detectors to produce a signal which permits sampling only when both squared voltage waveforms are at the second level.

2. A data sampling control circuit as recited in claim 1 wherein said logic means includes an AND gate.

3. A data sampling control circuit as recited in claim 1 further including signal combining means connected to the output of the logic means in said window generator means and in circuit with the transducer for recovering the output of the reading device only while said logic means is producing a sampling permit signal.

4. A data sampling control circuit as recited in claim 3 wherein the signal combining means comprises an AND-NOT gate.

* * * * *